United States Patent [19]

Souder, Jr. et al.

[11] 4,447,031
[45] May 8, 1984

[54] SPRING COUNTERBALANCED SUPPORT ARM SYSTEM

[75] Inventors: James J. Souder, Jr., Ann Arbor; Edward D. Scarborough, Jr., Inkster; Merlin D. Fox, Ann Arbor, all of Mich.; Donald R. Rettich; Robert L. Mason, both of Dayton, Ohio

[73] Assignee: Positioning Devices, Inc., Cincinnati, Ohio

[21] Appl. No.: 253,438

[22] Filed: Apr. 13, 1981

[51] Int. Cl.³ .............................................. E04G 3/00
[52] U.S. Cl. ............................... 248/280.1; 248/281.1
[58] Field of Search ................ 248/280.1, 586, 585, 248/592, 123.1, 281.1, 325; 267/175

[56] References Cited

U.S. PATENT DOCUMENTS

| | | | |
|---|---|---|---|
| 911,935 | 2/1909 | Baumwart | 248/586 X |
| 969,324 | 9/1910 | Bachman | 248/123.1 X |
| 2,131,693 | 9/1938 | Smith | 248/586 X |
| 2,834,568 | 5/1958 | Foster | 248/593 |
| 2,884,004 | 4/1959 | Dierdorf | 267/175 X |
| 2,967,433 | 1/1961 | Phillips | 248/586 X |
| 3,219,303 | 11/1965 | Stryker | 248/280.1 |
| 3,396,931 | 8/1968 | Eckstein | 248/280.1 |
| 3,409,261 | 11/1968 | Leporati | 248/586 |
| 3,426,190 | 2/1969 | Bobrick | 248/593 X |
| 4,339,100 | 7/1982 | Heller | 248/123.1 |

Primary Examiner—J. Franklin Foss
Attorney, Agent, or Firm—Krass and Young

[57] ABSTRACT

A support arm system for selectively positioning relatively heavy objects such as television sets consisting of articulated forward and rear arms each comprised of parallelogram linkages which are each sprung to counterbalance the load weight. A special mounting of the forward arm springs enables a compact configuration, but which introduces slight unbalance conditions in some arm positions. An adjustable friction brake arrangement is incorporated in a pivot point of each linkage which applies a braking force to insure stable positioning of each of the arms in any position throughout the motion of the arm system notwithstanding unbalanced conditions. Also disclosed is a quick connect feature for mounting the supported load to the forward arm, which is combined with a parking lock securing the forward arm in a folded position, which parking lock is released during the connecting feature. An access opening enables convenient adjustment of the forward arm spring force to precisely balance a given supported load weight.

16 Claims, 9 Drawing Figures

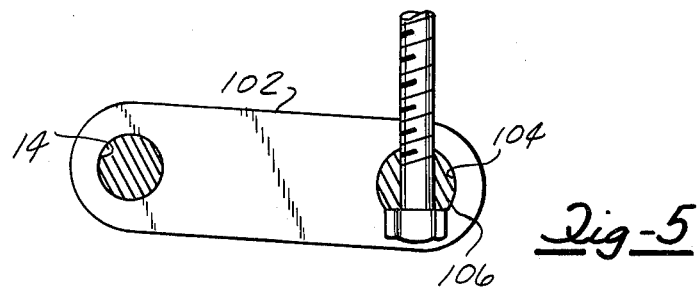
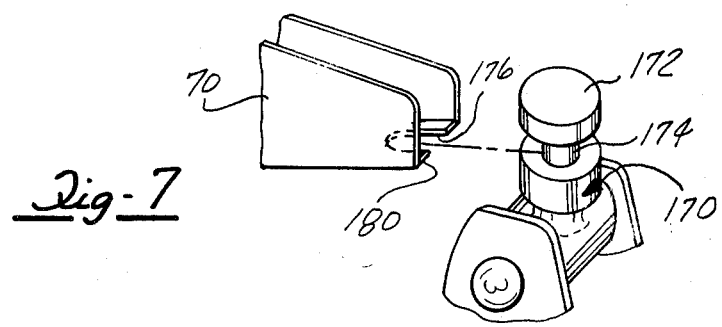
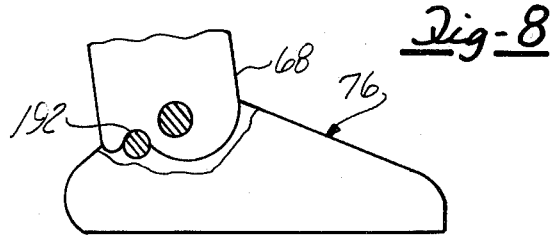
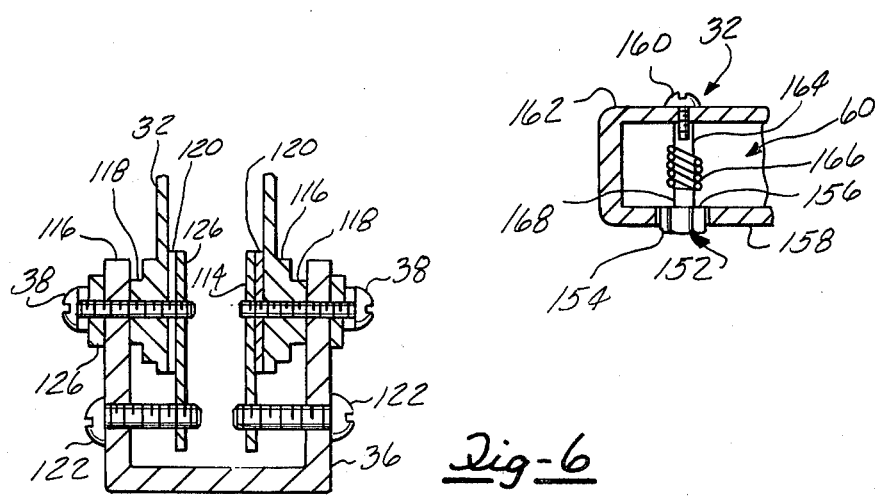

SPRING COUNTERBALANCED SUPPORT ARM SYSTEM

BACKGROUND ART

This invention concerns support arm systems and more particularly support arms of the type comprised of forward and rear articulated arms, each arm consisting of parallelogram linkage which is sprung so as to afford a counterbalancing of the supported load, such counterbalancing being achieved in any of various positions of the articulated support arm to enable stable positioning of the supported load as well as a constant orientation of the supported load for all positions of the support arm.

In copending application Ser. No. 61,135, filed July 26, 1979, there is disclosed such an articulated positioning arm system in which the forward arm spring mounting arrangement affords compactness thereof while enabling the use of conventional springs contained within nested channels comprising the forward arm parallelogram link members.

The general arrangement disclosed consists of the pair of links each pivotally connected at either end to brackets, with a pair of tension springs each connected at one end to one of the links and the other to one of the brackets. The line of action of each spring is such as to create a connecting moment about the pivots to the moment created by the arm weight and supported load. The geometry of the front arm is such that the spring leverage increases as the arm is moved towards the horizontal position to offset the increase in leverage of the supported weight. In order to minimize the degree of spring relaxation occurring during such motion, each spring is connected to its respective bracket at a point laterally offset from the pivot point of the connected link away from the direction of rotation of the link occurring as a result of swinging motion of the arm towards the horizontal position. The offset is designed to achieve a better matching of the torque caused by the supported load with the supporting torque which depends upon combinations of spring tension, the spring rate and the spring moment arm.

This particular spring mounting arrangement is such as to cause a slight unbalance between the counterbalancing force exerted by the springs and the weight of the arm and load in some positions of the arm. Thus, the load cannot be positioned by any angle of the forward arm without some provision being made to compensate for such unbalanced forces.

The aforementioned patent application describes a particular mounting arrangement for the forward arm springs in which the effective point of mounting of the springs is such as to be varied in different ranges of positioning of the forward arm which is such as to compensate for such unbalance which would otherwise occur.

While this does achieve the desired ability to counterbalance through the complete range of arm motion, it would of course be advantageous if such compensation could be provided for without the need for the extra components which are included in this arrangement.

The positioning arm system disclosed in that application is intended for use for supporting relatively heavy loads such as television receivers and which is intended to be sold as an assembly.

The combination of the positioning arm system and the supported load is such as to present a relatively cumbersome assembly and it is advantageous to enable separation of the television receiver from the arm system in order to more easily ship and handle the assembly during installation.

However, since the balancing springs exert a countering moment, the absence of the load necessitates some arrangement for preventing the arm from moving outwardly in the absence of such load if the load initially is not assembled to the arm.

It furthermore would be advantageous to provide relatively convenient methods for installing the television receiver such as to enable quick release in order to reduce the time and effort involved in the installation and also to enable ready removal thereof for servicing, etc. Any such arrangement should of course be preferably of maximum simplicity in order to minimize the manufacturing costs of the device.

Additionally, the forward arm springs are disclosed as being adjustable in order to vary the tension of the springs to precisely balance the supported load. In such cases, if the adjustment is lost during shipping, handling and installation of the device, it would be advantageous to provide a convenient means for adjusting the spring force as necessary in order to provide precise counterbalancing of the particular load.

Also, if the load weight is varied due to installation of differing or additional equipment thereon, it would be advantageous to be enable to carry out such adjustments without disassembly of the forward arm.

Accordingly, it is an object of the present invention to provide an articulated arm system of the general type described in which the forward arm springs are mounted at a point laterally offset from the link pivot point in which the resultant unbalancing of forces does not affect the stability of the support arm system in any position.

It is another object of the present invention to provide such articulated support arm system in which the arm system may be positioned in any of infinite positions with complete stability thereof without appreciably increasing the forces necessitated in moving the supported load from one position to another.

It is a further object of the present invention to provide such articulated support arm system in which a simplified parking lock is provided for securing the forward arm in a folded position such that the supported load may be removed without creating the possibility of unintended extension of the forward arm.

It is yet another object of the present invention to provide such articulated connection by which there is enabled a simplified and easily executed installation procedure for mounting the supported load to the forward arm.

It is still another object of the present invention to provide such support arm system in which a parking brake and supported load connection are related such as to reduce the possibility of removal of the supported load without installation of the parking lock and vice versa.

It is yet another object of the present invention to provide such articulated support arm of the type described wherein an arrangement is provided for enabling ready adjustment of the spring tension in the forward arm to enable convenient adjustment of the counterbalancing force.

SUMMARY OF THE INVENTION

These and other objects of the present invention, which will become apparent upon a reading of the following specification and claims, are achieved by a spring mounting arrangement for an arm consisting of a spring balanced parallelogram linkage of the type described in which the springs are mounted displaced behind the respective link pivot point such as to minimize the relaxation of the tension springs occurring as the forward arm moves toward the horizontal position, such as to minimize the spring strength required. The resulting unbalanced condition in the lower angles of the forward arm is precluded from causing instability of the arm position in any of the arm positions by the introduction of a friction braking force into a pivot point in the parallelogram linkage, which friction force is adjusted to be just greater than the largest unbalance force encountered through the range of arm motion. This allows ready movement of the forward arm during positioning of the supported loads while absorbing the unbalanced forces.

The friction brake is comprised by the use of a pair of brake plates which are each mounted such as to be rotatably fixed with respect to the bracket to which the corresponding link is pivoted, while contacting a respective portion of the link during pivoting motion. An adjustment in the friction force exerted on a pivot boss is enabled by means of a mounting screw adjustment which increases or decreases the friction force exerted on the link portions.

The brake plates are secured to the bracket at spaced points thereon in order to preclude relative rotation therebetween to insure relative rotation between the brake plate and link portion.

An intermediate felt washer is provided to minimize wear.

A similar friction brake is provided for the rear arm assembly in order to likewise compensate for any slight unbalance forces which may be introduced into the spring linkage system as a result of slight spring misadjustment, slight variations in the load weight, etc.

This arrangement is incorporated in an articulated support arm system consisting of the basic arrangement set forth in the aforementioned patent application, i.e., forward and rear arms, each of which consists of nested U-shaped channels and each of which is connected to form a parallelogram linkage. The forward arm has each of the U-shaped channel links pivoted to a nose bracket at one end thereof and at the other end to an elbow bracket.

A pair of counterbalancing springs is mounted to each respective bracket and to a respective link channel entirely enclosed within the channel extending down the length thereof to provide a compact and neat exterior.

The rear arm assembly is provided with similar nesting U-shaped channels comprising the links of the parallelogram linkage and within which is disposed a pair of counterbalancing springs, each connected at either end to the respective U-shaped channels. The U-shaped channel links are similarly pivotally mounted at one end to the elbow bracket and at the other to a base or mounting bracket which is adapted to be mounted to the supporting structure.

The counterbalancing springs in the forward arm are adapted to be mounted to the respective nose and elbow brackets by means of a pair of threaded bolts, each having an end extending through a respective cross mounting tube mounted in the nose and elbow bracket. One of the bolts has its head portion disposed adjacent the upper side of the elbow bracket which is provided with an access opening in registry with the bolt head. The opening is normally closed with an access cover or plug, removal of which enables ready access with a wrench to provide adjustment of the bolt.

Each of the bolts is threadably engaged in sockets secured to either end of the respective counterbalancing springs, such that upon rotation with a wrench or similar tool, the spring force may be adjusted for precise balancing of the load during assembly and/or variations in the spring force with changes in the supported load weight.

A quick disconnect feature is also provided enabling ready attachment and detachment of a supported load such as a television receiver to the nose bracket. The nose bracket is generally U-shaped and extends forwardly from the lower end of the forward arm assembly.

The bottom wall of the nose bracket is configured with a U-shaped slot extending into the forward edge thereof which is adapted to mate with an enlarged flange on a support socket.

A cover when in position covers the forward and upper open sides created by the nose bracket sidewalls and when secured traps the socket support flange in the nose bracket slot. The cover is secured in place by means of a cross bolt passing through openings approximately located in the nose bracket sidewalls.

The cross bolt is intended to be removed from a parking lock hole located in the nose bracket sidewalls, the hole location adapted to position the bolt so as to interfere with the forward edges of one of the forward arm channel links to preclude relative rotation between the nose bracket and link in a direction corresponding to forward swinging movement of the forward arm.

Thus, with the parking lock bolt in position, inadvertent forward extension of the arm caused by the absence of the supported load is minimized.

At the same time, the removal of the parking lock bolt and positioning into the cover at installation of the supported load further contributes to the reduction in possibility that such inadvertent extension will occur since removal of the parking lock bolt normally takes place only after installation of the supported load.

DESCRIPTION OF THE DRAWINGS

FIG. 3 is a view of section 3—3 taken in FIG. 2.

FIG. 4 is a view of section 4—4 taken in FIG. 3.

FIG. 5 is a view of section 5—5 taken in FIG. 2.

FIG. 6 is an exploded perspective view of the mating portion components for the attachment of the supported load to the forward arm.

FIG. 7 is an enlarged fragmentary view of the nose bracket and a portion of the forward arm assembly revealing the inter-reaction of the parking lock bolt with one of the forward arm assembly linkages.

FIG. 8 is a side elevational fragmentary view of the forward arm revealing the parking lock details.

FIG. 9 is a fragmentary sectional view taken along lines 9—9 in FIG. 2.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
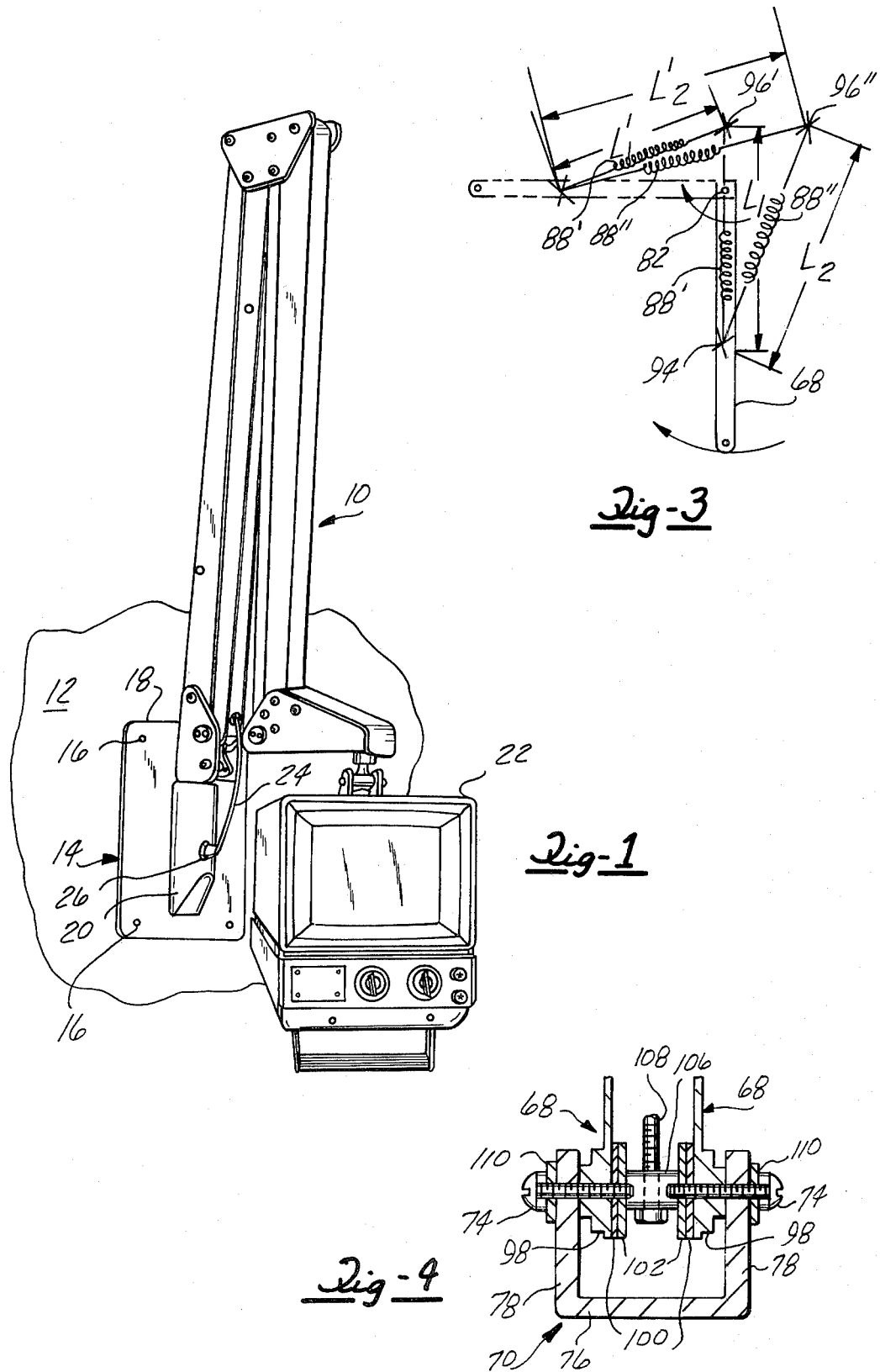
FIG. 1 is a perspective view of an installed articulated support arm system according to the present invention with a television receiver installed as the supported load.

Referring to the drawings and particularly FIG. 1, the articulated support arm system 10 according to the present invention is shown installed on a wall 12 by means of a mounting bracket 14 secured to the wall 12 by means of lag bolts 16 passing through openings formed in mounting plate 18. The mounting bracket 14 also includes an integral socket 20 adapted to receive a base pin hereinafter described to enable swiveling movement of the articulated support arm system 10 on the mounting bracket 14.

The articulated support arm system 10 is shown as having a support for a television receiver 22 and the necessary electrical connection for power supply and input signals are made via cable 24 plugged into an outlet 26 passing through the interior of the articulated support arm system 10 and with an appropriate connection (not shown) made to the television receiver 22.

By reference to FIGS. 2 through 7, the details of the construction of the articulated support arm system 10 may be understood.

The articulated support arm system 10 consists of a forward arm 28 and a rear arm 30, the rear arm 30 consisting of a pair of parallel U channel links 32 and 34 nested together. Each of the U channel links 32 and 34 are pivotally mounted at one end to a generally U-shaped base bracket 36 at pivots comprised of opposed pairs of screws 38 and 40, respectively, and at their other ends to a generally U-shaped elbow bracket 42 at pivots comprised of opposed pairs of screws 44 and 46, respectively, to thus form a parallelogram linkage of the links and brackets.

The base bracket 36 receives a base pin 48 having a lower end received within the socket 20, the upper end in turn received in a socket 50 formed into the lower face of the base bracket 36 and secured with set screws 52. The opposed pairs of machine screws 38, 40, 44 and 46 pass through aligned pairs of bores formed through sidewalls of the respective base bracket 36 and elbow bracket 42 and are threadedly received into bores formed in the sidewalls of the U channel links 32 and 34.

The machine screws 38 also provide the friction brake adjustment function as will be described hereinafter.

The parallelogram linkage of which the rear arm 30 is comprised creates relative linear movement between the U channel links 32 and 34 as these elements rotate together about the various pivot points during swinging motion of the rear arm 30.

Such linear motion is resisted by a pair of tension springs 54 and 56. Tension spring 54 is anchored at one end of a weld pin 58 secured to the U channel link 34 and at its other end anchored by means of a tension adjusting arrangement 60 carried by the other U channel link 32, while tension spring 56 is anchored to pin 62 carried by the U channel link 32 and at its other end by tension adjustment arrangement 64 carried by the U channel link 34. Each tension spring 54 and 56 therefore resists relative movement of the U channel links 32 and 34 in the direction produced by downward or away swinging of the rear arm 30 on the base bracket 36.

Since the weight of the arm and the attached load act to create a tendency to produce motion in that direction, the tension springs 54 and 56 act to resist the supported weight and by proper calibration thereof these springs can be arranged to counterbalance the weight of the arm and attached load in the known manner.

The relative linear movement so produced causes increasing extension of the tension springs 54 and 56 as such rotation proceeds such that an increasing spring force is available which offsets the increased leverage of the arm weight causing rotation about the respective pivot points, such that such weight is substantially counterbalanced in all positions of the rear arm 30.

The forward arm 28 similarly includes nested U channel links 66 and 68 which are each pivotally mounted at one end to a nose bracket 70 by means of opposing pairs of machine screws 72 and 74 threadedly received in the sidewalls 78 of the nose bracket 70. Nose bracket 70 consists of a generally U-shaped member having a bottom wall 76 and a pair of sidewalls 78.

The opposite ends of the U channel links 66 and 68 are also pivoted to the elbow bracket 42 by means of opposing pairs of machine screws 80 and 82 passing into holes formed in the sidewalls of the elbow bracket 42 and threadedly received therein.

Counterbalancing springs are also provided for the forward arm constituted by helically-wound tension springs 84 and 88. Tension spring 84 is anchored at one end to a weld pin 90 secured to U channel link 66 and at the other end to the nose bracket 70 at a point beyond the pivot axis constituted by machine screws 72 by means of an adjustable connection generally indicated at 92 which will be therefore described in further detail hereinafter.

Tension spring 88 is connected by a weld pin 94 to the U channel link 68 at the one end and at the other end to the elbow bracket 42 at a point beyond the pivot axis constituted by the machine screws 82 by means of an adjustable connection indicated at 96.

The forward arm 28 forward swinging motion away from the elbow bracket 42 is resisted by the tension of the tension springs 84 and 88. Furthermore, the leverage of the spring force component acting on the respective links to impose a countering moment about the pivots constituted by machine screw pairs 72, 74, 80 and 82 increases with increasing extension of the forward arm 28 such as to provide an increasing counterbalancing moment offsetting the increasing moment exerted by the supported load with more advanced positions of the forward arm 28 approaching the horizontal position.

However, the arm motion of the tension springs 84 and 88 swinging about differing points than the axis of rotation of the respective connected U channel links 66 and 68 results in a slight relaxation of the tension springs 84 and 88 resulting from a shortening of the distance between the respective points of connection. This relaxation tends to decrease the spring force available at or near the horizontal position of the forward arm 28.

In order to substantially compensate for this relaxation effect, the point of connection of the tension springs 84 and 88 to the respective nose and elbow brackets is shifted laterally with respect to the pivot points in a direction away from the pivotal movement of the respective U channel link 66 or 68 induced by arm motion in moving toward the horizontal position.

The advantage of this mounting location can be appreciated by referring to FIG. 3 in which the U channel link 68 is depicted diagrammatically in connection with the tension spring 88.

If the point of connection of the tension spring 88 is directly above the pivot point as depicted by the spring 88' at the point of adjustable connection 96', then as the U channel link 68 swings to the horizontal position, indicated in phantom, the distance L1 to L1' is considerably shortened. On the other hand, with the tension spring 88" connected at a point laterally positioned away from the direction of rotation of the channel link 68 at 98", the reduction of spring length (i.e., L2 to L2') is much less such that there remains a much greater tensioning of the spring 88" at the arm horizontal position.

The net effect is to enable the use of relatively compact arm structures so that the spring may be housed completely within the U channel arm without resorting to exotic spring materials or configurations.

Figure 2:
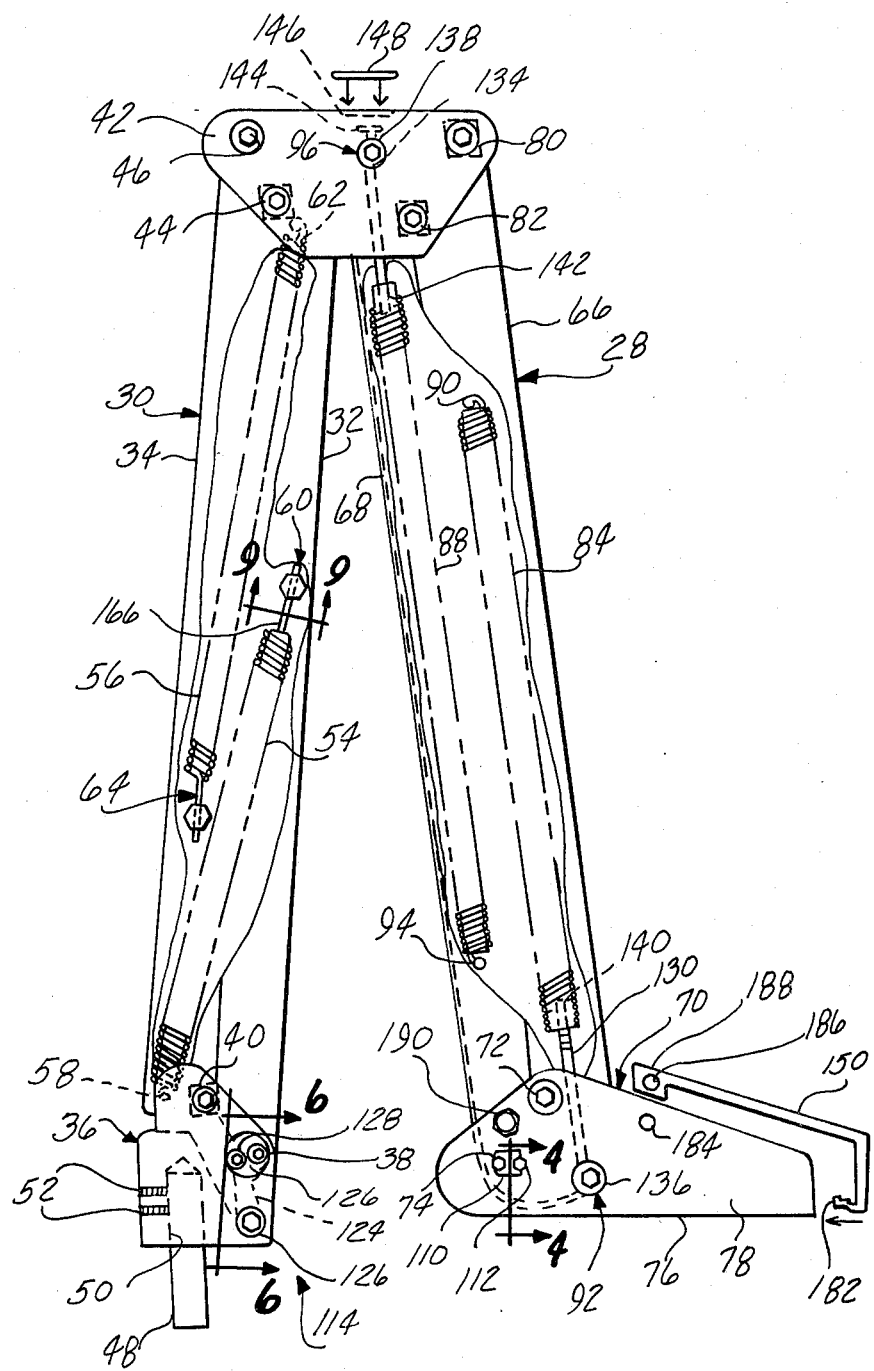
FIG. 2 is a side elevational view of the support arm depicted in FIG. 1 showing portions thereof broken away to reveal the interior details.

In this arrangement depicted in FIG. 2, in the down position of the forward arm 28, the line of action of the tension springs 84 and 88 is passed over center, between the opposed machine screws 72 and 82 such that the spring force urges the forward arm 28 downwardly to provide a stable over-center positioning of the forward arm 28 in a stable stowage position.

Upon swinging movement forward and up of the forward arm 28 such that the lines of force of tension springs 84 and 88 move past the respective pivot axes of the U channel links 66 and 68, the springs will urge the forward arm 28 towards an extended position. As noted, due to the linkage geometry, the moment increases with increasing extension of the forward arm 28 to offset the increase in moment exerted by the weight of the suspended load in a manner well known to those skilled in the art.

On the other hand, the offset positioning of the points of spring connection relative the link pivot points produces an effect such that perfect counterbalancing is not achieved in all positions of the arm, particularly at the lower angles of the forward arm 28.

According to the concept of the present invention, a friction braking force is introduced into the parallelogram linkage of both the forward and rear arms of a magnitude greater than the unbalanced weight and spring forces in any position of either the forward arm 28 or rear arm 30, such that the unbalance between the supported load and the tension springs acting on the parallelogram linkages does not result in instability movement of the arm system position in any position.

This frictional braking force is applied so as to be adjustable such that necessary friction forces may be generated which are just sufficient to absorb the unbalanced forces while not introducing excessive friction into the pivot which could create stiffness in the motion of the arm system.

The particular arrangement for generating such frictional braking forces consists of a pair of friction brake plates mounted to introduce friction to the pivot defined by the opposing machine screws 74. Machine screws 74 pass through the nose bracket sidewalls 78, through bosses 98 integral with the sidewalls of the U channel link 68, and through a pair of felt washers 100 disposed adjacent the interior faces thereof. The machine screws 74 are each threadably received in a suitable threaded bore machined in friction brake plates 102.

The friction brake plates 102 are rendered rotatably stationary by a portion thereof extending laterally away from the machine screws 74 and provided with a bore 104. The bore 104 receives an anchor tube 106 mounted between the sidewalls 78 of the nose bracket 70 serving to provide an anchor and a tension adjusting pin 108.

Thus, as the forward arm 28 swings, the friction brake plates 102 remain stationary with respect to the nose bracket 70 and insure relative rotation between the U channel link 68 and the friction brake plates 102. Thus, the rubbing contact of the felt washers 100 applies frictional braking forces tending to resist the pivoting rotation.

The level of braking force is adjusted by the advance or backing off of the machine screws 74 so as to create greater or lesser pressure between the felt washers 100 and the friction brake plates 102 and the mating interior face of the sidewalls of the U channel link 68.

In order to tighten any looseness in the pivots comprised of the pairs of machine screws 74, eccentric pivot plates 110 are provided, each having through bores through which pass the machine screws 74 and each also provided with an end slot through which machine screws 112 pass such that lateral adjustment will enable necessary tightening of the pivots.

Friction brake plates 114 are also provided for the pivotal connection comprised by the machine screws 38, which each pass through a sidewall 116 of the base bracket 36 and thence through a boss 118 formed on each sidewall of the U channel link 32 and through a felt washer 120. Each is threadably received in a bore formed through each of the friction brake plates 114. In order to provide anchoring of the friction brake plates 114, a tail portion thereof is formed with threaded holes which receive respective anchoring machine screws 122 passing through the sidewalls of the base bracket 36. In order to provide clearance for rotation of the U channel link 32, a V-shaped relief 124 is provided on each of the friction brake plates 114.

Similarly, the variable tightening of the machine screws 38 provides a greater or lesser frictional force acting between the friction brake plates 114 and the U channel link 32 via washers 120. Accordingly, as relative rotation occurs between the base bracket 36 and the U channel link 32, the friction brake plates 114 being stationary exert the necessary frictional froces to absorb any unbalance in the parallelogram linkage.

Eccentric pivot plates 126 are provided, each having through bores receiving machine screws 38, with machine screws 128 disposed in slots formed therein for tightening of the pivotal joints comprised by the machine screws 38.

It can be appreciated by the expedient of providing a frictional brake on pivot joints in each linkage that any force unbalance in the various positions of the forward arm 28 and rear arm 30 will not result in instability in the system position if the adjustment results in the imposition of a sufficient magnitude of forces. The correct adjustment is that which just absorbs the largest unbalance so as to not introduce unnecessary stiffness of the arm system.

Means are also provided for adjusting the spring force of the tension springs 84 and 88 which means includes adjustable connections 92 and 96. Each connection includes threaded long shank bolts 130 and 132, respectively. Bolt 130 passes through the previously noted anchor tube 106, while bolt 132 passes through anchor tube 134 mounted between the two sidewalls of the elbow bracket 42. The anchor tube 106 is mounted by means of a pair of machine screws 136, while anchor tube 134 is mounted by opposing machine screws 138 each threadedly received therein.

Shank bolts 130 and 132 each are received in respective threaded sockets 140 and 142 mounted in the respective ends of the tension springs 84 and 88. Thus, rotation of the bolts 130 and 132 causes increase or decrease in tension of the corresponding tension springs 84 and 88 in order to afford an accurate adjustment of the applied spring force.

The shank bolt 132 extends upwardly into the interior of the elbow bracket 42 as noted and is positioned with its hex head 144 below the top wall of the elbow bracket 42. An access opening 146 is formed thereinto opposite the location of the hex head 144 and a removable access cover 148 provided such that adjustment may be conveniently executed by removal of the access cover 148, with insertion of the appropriate size socket to engage hex head 144 in order to provide an increase (or decrease) in spring tension as required.

Adjustment of the tension of the spring 84 is afforded by removal of a nose bracket 150 and positioning of the forward arm 128 in the full forward position enables access through the interior of the nose bracket 70.

Tension adjusting arrangements 60 and 64 are also provided for the respective rear arm tension springs 54 and 56. This arrangement is similar to that disclosed in the copending patent application identified above. As shown in FIG. 9, spring adjustment pins 152 are provided extending through the sidewalls of the respective U channel links 32 and 34. In FIG. 9, the arrangement is described in relationship to the U channel link 32, but it is to be understood that an identical arrangement 64 is provided for the U channel link 34.

The hex head of the spring adjustment pin 152 is received into a hexagonal opening 156 formed in the sidewall 158 of the U channel link 32 normally positioned therein so as to be rotatably anchored. The spring adjustment pin 152 is maintained in such position by means of an anchoring screw 160 passing through a corresponding bore in the opposite sidewall 162 of the U channel link 32 and threadably received in a threaded bore 164 formed into the opposite end of the spring adjustment pin 152.

A length of cable 166 is anchored to one end of the tension spring 54 and also anchored to a body pin section 168 of the spring adjustment pin 152 shown in FIG. 9 with several wraps being wound thereabout. By backing off the anchoring screw 160, engagement of the protruding hex head 154 by means of a box wrench or similar tool may be achieved and the spring adjustment pin 152 may be backed out of the hexagonal opening 156 enabling rotation thereof to allow further wind up (or down) of the cable 166 and increase (or decrease) in tension thereof.

After such rotation, the hex is reinserted into the hexagonal hole 156 and the anchoring screw 160 retightened.

A quick connection feature is provided for ready installation of the television receiver. As seen in FIG. 7, support fixture 170 is provided including a flange 172 and a reduced diameter section 174. The nose bracket 70 is provided with a U-shaped slot 176 extending rearwardly from the forward edge 180. Upon removal of the access cover 148, the reduced diameter section 174 may be slid into the U-shaped slot 176 to thus support the support fixture 170 on the flange 172.

The access cover 148 is snapped back into position with the lip 182 coming into abutment with the flange 172 thus securing the support fixture 170 in position. The access cover 148 itself is retained by means of a cross bolt passing through bores 184 formed in the sidewalls 78 of the nose bracket 70 and a bore 186, formed across the width of the cover through an increased thickness section 188 and moving into registry therewith upon positioning of the access cover 148 in the installed position.

Preferably, this arrangement is integrated with the parking lock consisting of a parking lock bolt 190 (FIG. 8) which extends across an end face of the U channel link 68 such as to be received within an arcuate contour 192 formed on the end of either sidewall of the U channel link 68 such that upon limited pivotal rotation of the links 68, the nose bracket 70 moves into abutment therewith to prevent relative rotation to in turn preclude extension of the forward arm 28.

Thus, the supported load may be removed without occurrence of unintended extension of the forward arm 28.

Preferably, the parking lock bolt 190 is configured of the same length and diameter such as to be fit within the cross bores 184 and 186.

Accordingly, at installation of the television receiver 22, the parking lock bolt 190 is removed and installed in the cover to minimize the possibility of extension of the forward arm 28 with the television receiver 22 removed.

Accordingly, it can be appreciated that the above-recited objects of the invention have been achieved by the arrangement described, i.e., a simple yet reliable means for eliminating the effect of unbalance conditions insuring stable positioning of the arm system.

A convenient arrangement is provided for enabling adjustment of the tensioner springs such as to simplify maintenance requirements thereof to maintain a precisely counterbalanced load and/or simplifying adjustments necessary for changes in the weight of the supported load.

Finally, the quick disconnect feature enables rapid installation and removal of the supported load as for servicing of the television, which is integrated with a parking lock arrangement such as to minimize the occurrence of unintended extension of forward arm assembly in the absence of the supported load.

The embodiments of the invention in which an exclusive property or privilege is claimed are defined as follows:

1. A counterbalanced swinging arm including a parallelogram linkage for supporting a load in various adjusted positions of said arm while counterbalancing said load in any of said positions, said parallelogram linkage comprising:
   a pair of parallel links;
   a first bracket;
   means pivotally mounting one end of each of said links to said first bracket;
   a second bracket and means pivotally mounting the other end of each of said links to said second bracket;
   means for supporting said first bracket for enabling outward swinging movement of said links on said pivotal mounts;
   means for attaching a load to said second bracket;

spring means connected to act on said second bracket and on at least one of said links along a line of direction so as to resist rotation of said one of said links about said pivotal mounts thereof in a direction opposite to a moment created by the weight of said attached load, said spring means located to exert a spring force acting with increasing leverage on said pivotal mount through a range of motion of said parallelogram linkage in swinging outwardly away from said first bracket thereby to produce a counterbalancing moment with outward movement of said parallelogram linkage to thereby offset the increase in moment exerted by said attached load with said outward arm motion;

adjustable friction brake means introducing a frictional braking force into said pivotal mounts of one of said links;

whereby a frictional braking force resisting said pivotal movement is introduced into said parallelogram linkage to absorb any unbalanced moment exerted by said attached load and spring means at positions of said parallelogram linkage as said arm undergoes said swinging motion.

2. The counterbalanced arm according to claim 1 wherein said spring means includes a tension spring affixed at one end thereof to said at least one link and attached at the other end thereof to said second bracket.

3. The counterbalanced arm according to claim 2 wherein said point of connection of said tension spring to said second bracket is on a side remote from the pivotal mount of said one link to said second bracket and laterally displaced away from the direction of rotation of said link produced by said arm swinging movement away from said second bracket.

4. The counterbalanced arm according to claim 1 wherein said adjustable friction means comprises at least one brake plate, means mounting said at least one brake plate stationary relative to said second bracket and means for adjustably positioning said brake plate to exert a pressure on a relatively rotating portion of an associated pivotally mounted link.

5. The counterbalanced arm according to claim 4 wherein said second bracket to which said brake plate is mounted is formed with a pair of sidewalls and wherein said associated link includes a portion thereof extending intermediately of said sidewalls, wherein said means providing pivotal mounting thereof comprises a pair of oppositely extending threaded elements extending through said sidewalls of said bracket and through holes formed in said link; wherein a central region is disposed intermediate said associated link portions and further including a pair of brake plates having bores formed therein threadably engaged by said respective threaded elements adapted to draw a respective brake plate toward a respective portion of said link to produce an adjustable friction force acting therebetween.

6. The counterbalanced arm according to claim 5 further including a pair of intermediate washers one each disposed on each of said threaded elements and adapted to be engaged between said portions of said associated link and said respective brake plate.

7. The counterbalanced arm according to claim 5 wherein said means mounting each of said brake plates consists of securement means laterally offset from said axis of said threaded element engaging each of said brake plates and a respective sidewall of said bracket to thereby rotatably fix each of said brake plates with respect to said bracket.

8. An articulated support arm system including:
a base bracket;
means for mounting said base bracket to a supporting structure;
a rear arm including:
a pair of elongate parallel rear arm links;
means pivotally connecting one end of each of said rear arm links to said base bracket;
an elbow bracket;
means pivotally mounting the other end of each of said rear arm links to said elbow bracket;
a forward arm including;
a pair of forward arm links;
means pivotally mounting each of said forward arm links to said elbow bracket;
a nose bracket and means pivotally mounting the other end of each of said forward arm links to said nose bracket to create parallelogram linkages constituting respectively said forward and rear arms;
whereby said forward and rear arms are articulated by means of said common connection to said elbow bracket, and said rear arm is mounted for movement down and away from said base bracket and said forward arm mounted for swinging movement up and away from said elbow bracket;
rear arm spring tension means associated with said rear arm acting on at least one of said rear arm links to produce a countering moment acting about said link pivotal connections resisting movement of said rear arm in response to the weight carried thereby;
said rear arm spring tension means including means applying said spring force with an increasing extent of outward movement of said rear arm assembly away from said base bracket to thereby countereffect the increasing moment exerted by said weight carried with an increasing extent of swinging movement away from said base bracket;
forward arm spring tension means connected at one end to a point on one of said forward arm links and connected at its other end to a point beyond the pivotal connection of said link to either said elbow bracket or said nose bracket and at a point laterally displaced away from the direction of rotation of said link occurring with said forward arm swinging away from said either said elbow bracket or said nose bracket for exerting a spring force acting on at least one of said forward arm links resisting rotation of said links in directions corresponding to downward swinging movement of said forward arm towards said elbow bracket, said forward arm spring tension means including means increasing the leverage of said spring force acting to create said counter moment in increasingly advanced positions of said forward arm away from said elbow bracket to thereby provide a means for counterbalancing the weight of an attached load secured to said nose bracket;
adjustable friction brake means associated with at least one of said pivotal connections in said forward or rear arms introducing an adjustable amount of friction braking force acting to resist rotation of an associated link with respect to the associated bracket affording said associated link a pivotal support;
whereby unbalances between the moments exerted in said pivotal connection by the associated arm between said spring tension means and the weight of said arms and attached load is at least partially absorbed by said friction brake means.

9. The support arm system according to claim 8 wherein said adjustable friction means is associated with at least one pivotal connection with respect to each of said forward arm and said rear arm, respectively, whereby unbalanced conditions in either said forward or rear arms linkages are at least partially absorbed by said friction force exerted thereby.

10. The support arm system according to claim 8 wherein said forward arm spring tension means comprises at least one tension spring.

11. The support arm system according to claim 10 wherein said forward arm spring tension means includes a second tension spring connected to the other of said forward arm links at one end and connected to the other of said elbow bracket or said nose bracket to which said at least one tension spring is connected, a point thereon beyond said pivotal connection of said other forward arm link, said point laterally displaced away from said pivotal connection from the direction of rotation of said link produced by swinging motion of said forward arm away from said elbow bracket.

12. A method of stabilizing a counterbalanced parallelogram arm linkage, the linkage comprising a pair of parallelogram links each pivotally supported at each end to respective brackets to form a parallelogram linkage and supplied with spring tension means exerting a countering force on at least one of said links so as to establish a counter moment on said links countering said rotation about one of said pivotal connections in a sense opposite to the rotation of said connection under the weight of a supported load and wherein said spring tension means produces increasing leverage of a spring force acting on said pivotal connection with positioning of said linkage in position so as to exert a greater moment than the weight of an attached load to produce a countering force offsetting the increased leverage of said supported load, the spring tension means being connected at one end to a point on one of said links and at the other end to one of said brackets at a point beyond the pivotal connection of said links and laterally displaced therefrom in a direction away from the direction of rotation of the link as it moves away from said one bracket, said connection producing less than perfect equilibrium at all positions thereof, the method of eliminating said instability comprising the steps of:
   introducing a frictional force into the pivotal connection of said linkage arms to just absorb the unbalanced moments experienced by said linkage in undergoing said swinging movement of said linkage.

13. In a counterbalanced arm including a parallelogram linkage including a nose bracket of generally U shape and including a pair of sidewalls and a bottom portion thereof, and a pair of parallelogram links pivotally connected to said nose bracket, the improvement comprising:
   an attachment feature securing an attached load to said nose bracket, comprising:
   a cover configured to be fit over the front and top of said nose bracket;
   means for detachably securing said cover to said nose bracket, said cover further including a lip portion disposed extending across said slot in said installed position;
   whereby a flange support fixture may be slid into said slot and secured therein by an installation of said cover means.

14. The counterbalanced arm according to claim 13 further including a parking lock means including a transverse bore formed through said sidewalls of said nose bracket and further including a parking lock bolt adapted to be installed in said aligned bores and further including a nose portion formed on one of said links pivotally connected to said nose bracket adapted to be contacted by said bolt in said installed position and restraining relative pivotal movement with respect to said nose bracket thereby securing said nose bracket relative to said link and restrain swinging motion of said parallelogram linkage;
   said means for detachably securing said cover to said nose bracket comprising a pair of aligned bores formed through said sidewalls of said nose bracket and further including a transverse bore formed in a portion of said cover adapted to be positioned in alignment between said bores with said cover in said installed position; and,
   wherein said configuration of said bores in the sidewalls of said nose bracket associated with said parking lock means and with said means for detachably securing said cover means including a configuration adapted to be interfit with said parking lock bolt, whereby said parking lock bolt may be removed at the installation of the cover thereof to secure said cover to thereby minimize the possibility of any motion of said counterbalancing linkage in the absence of said supported load.

15. In a counterbalancing parallelogram linkage arrangement consisting of nested U-shaped elongated channel links, a first bracket pivotally mounted to one end of each of said U-shaped channel links by pivotal connections;
   a second bracket pivotally mounted to the other end of each of said channel links by pivotal connections, each of said brackets being generally U-shaped in configuration and each having a pair of sidewalls and connecting wall to form said U-shape wherein each of said pivotal connections is provided by pivot means extending transversely through said respective sidewalls and wherein said counterbalancing parallelogram linkage means further includes spring tension means including at least a pair of tension springs, both of which are mounted within said nested U channel means, each of said tension spring means being connected at one end to a respective U channel link and extending along the length thereof, each connected at the opposite end to a respective one of said first and second brackets by means including a transverse pin mounted to the respective sidewalls of said first and second brackets;
   a pair of hex headed bolts, one each extending through one of said transverse anchoring pins and means for threadably engaging each of said hex headed bolts and with the other end of a respective one of said pair of tension springs;
   whereby rotation of said bolts causes a corresponding increase or decrease in tension of said tension spring means;
   access opening means formed in at least one of said brackets including an opening in registry with said hex head of one of said hex headed bolts, whereby exterior access thereto is afforded for adjustment of said spring tension means.

16. The counterbalancing linkage arrangement according to claim 15 further including cover means covering said access opening.

* * * * *